(12) United States Patent
Kinoshita et al.

(10) Patent No.: US 10,361,424 B2
(45) Date of Patent: Jul. 23, 2019

(54) METHOD OF MANUFACTURING NEGATIVE ELECTRODE FOR NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Koji Kinoshita, Toyota (JP); Hiroshi Nagase, Miyoshi (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 251 days.

(21) Appl. No.: 15/040,546

(22) Filed: Feb. 10, 2016

(65) Prior Publication Data
US 2016/0240847 A1 Aug. 18, 2016

(30) Foreign Application Priority Data

Feb. 12, 2015 (JP) ................................. 2015-025110

(51) Int. Cl.
*B29C 43/24* (2006.01)
*B32B 5/16* (2006.01)
(Continued)

(52) U.S. Cl.
CPC ............ *H01M 4/043* (2013.01); *B29C 43/24* (2013.01); *B32B 5/16* (2013.01); *B32B 37/24* (2013.01);
(Continued)

(58) Field of Classification Search
CPC ....... B29C 43/24; B29C 43/28; B29C 43/305; B29C 43/46; B32B 5/16; B32B 15/16; B32B 15/20; B32B 37/24; B32B 2264/102; B32B 2457/10; H01M 4/0404; H01M 4/043; H01M 4/0435; H01M 4/0471; H01M 4/131; H01M 4/133; H01M 4/139;
(Continued)

(56) References Cited

U.S. PATENT DOCUMENTS

2011/0052954 A1\* 3/2011 Fujiwara ............. H01M 4/0404
429/94
2011/0244322 A1 10/2011 Hong et al.
(Continued)

FOREIGN PATENT DOCUMENTS

JP 2001-283861 A 10/2001
JP 2001283861 A \* 10/2001
(Continued)

*Primary Examiner* — Michael A Tolin
(74) *Attorney, Agent, or Firm* — Sughrue Mion, PLLC

(57) ABSTRACT

A method of manufacturing a negative electrode for a nonaqueous electrolyte secondary battery, the method includes mixing negative electrode active material particles and ferroelectric particles with each other to form first composite particles in which the ferroelectric particles are attached to the negative electrode active material particles; mixing the first composite particles and a binder with each other to form granulated particles; applying pressure to an aggregate of the granulated particles to form a sheet-shaped negative electrode mixture layer; and arranging the negative electrode mixture layer on a main surface of a negative electrode current collector foil.

8 Claims, 11 Drawing Sheets

(51) Int. Cl.
    *B32B 37/24* (2006.01)
    *H01M 4/1393* (2010.01)
    *H01M 4/62* (2006.01)
    *H01M 4/04* (2006.01)
    *H01M 4/139* (2010.01)
    *H01M 10/0525* (2010.01)

(52) U.S. Cl.
    CPC ......... *H01M 4/0435* (2013.01); *H01M 4/139* (2013.01); *H01M 4/62* (2013.01); *H01M 4/622* (2013.01); *B32B 2457/10* (2013.01); *H01M 4/1393* (2013.01); *H01M 10/0525* (2013.01)

(58) Field of Classification Search
    CPC .. H01M 4/1391; H01M 4/1393; H01M 4/362; H01M 4/364; H01M 4/587; H01M 4/62; H01M 4/622; H01M 2004/027; H01M 10/0525; H01M 10/4235; H01M 2200/106; Y02E 60/122; Y02T 10/7011
    See application file for complete search history.

(56) References Cited

U.S. PATENT DOCUMENTS

| | | | |
|---|---|---|---|
| 2013/0260250 A1 | 10/2013 | Yada et al. | |
| 2015/0207148 A1* | 7/2015 | Kimura | H01M 4/622 |
| | | | 429/199 |
| 2016/0172678 A1* | 6/2016 | Oyama | H01G 11/38 |
| | | | 429/217 |

FOREIGN PATENT DOCUMENTS

| | | | | |
|---|---|---|---|---|
| JP | 2011-210694 A | 10/2011 | | |
| JP | 2012-142268 A | 7/2012 | | |
| JP | 2013-055049 A | 3/2013 | | |
| JP | 2013-77560 A | 4/2013 | | |
| JP | 2014-049240 A | 3/2014 | | |
| KR | 10-2010-0062719 A | 6/2010 | | |
| WO | 2010/064755 A1 | 6/2010 | | |
| WO | WO-2015016283 A1 * | 2/2015 | ............ | H01G 11/38 |

* cited by examiner

METHOD OF MANUFACTURING NEGATIVE ELECTRODE FOR NONAQUEOUS ELECTROLYTE SECONDARY BATTERY

INCORPORATION BY REFERENCE

The disclosure of Japanese Patent Application No. 2015-025110 filed on Feb. 12, 2015 including the specification, drawings and abstract is incorporated herein by reference in its entirety.

BACKGROUND OF THE INVENTION

1. Field of the Invention

The present invention relates to a method of manufacturing a negative electrode for a nonaqueous electrolyte secondary battery.

2. Description of Related Art

Japanese Patent Application Publication No. 2013-055049 (JP 2013-055049 A) discloses a method of composite particles for an electrode, the method including: a step of preparing a slurry by dispersing an electrode active material, a binder, and an antioxidant in water; and a step of spray-drying the slurry to be granulated.

Composite particles obtained by mixing an electrode active material and a binder with an additive (in JP 2013-055049 A, an antioxidant) are known. In the related art, it is known that, as long as an additive is present, an effect corresponding to the abundance thereof can be exhibited. However, according to the present study by the present inventors, an additive, which exhibits its effect by arranging the additive to have a specific arrangement in composite particles, has been found.

SUMMARY OF THE INVENTION

In consideration of the above-described circumstances, an object of the invention is to provide a negative electrode for a nonaqueous electrolyte secondary battery having superior high-rate (high-current) characteristics.

[1] A method of manufacturing a negative electrode for a nonaqueous electrolyte secondary battery includes: a first step of mixing negative electrode active material particles and ferroelectric particles with each other to form first composite particles in which the ferroelectric particles are attached to the negative electrode active material particles; a second step of mixing the first composite particles and a binder with each other to form granulated particles; a third step of applying pressure to an aggregate of the granulated particles to form a sheet-shaped negative electrode mixture layer; and a fourth step of arranging the negative electrode mixture layer on a main surface of a negative electrode current collector foil.

In the manufacturing method according to [1], the ferroelectric particles as an additive cause a catalytic action of reducing reaction resistance between lithium (Li) ions and the negative electrode active material particles. As a result, the improvement of high-rate characteristics can be expected. The reason for this is considered to be as follows: the ferroelectric particles promote the desolvation of solvated Li ions and reduce activation energy in an intercalation reaction of Li ions into the negative electrode active material particles.

According to the study by the present inventors, the ferroelectric particles can sufficiently exhibit the above-described catalytic action when directly attached to surfaces of the negative electrode active material particles. However, with a manufacturing method of the related art, it is difficult to realize the above-described attachment state. That is, since negative electrode active material particles, a binder, and ferroelectric particles are collectively mixed with each other, the binder is interposed between the negative electrode active material particles and the ferroelectric particles, and thus the catalytic action cannot be sufficiently exhibited. It can be said that the ferroelectric particles are simple resistors except for the above-described catalytic action. Therefore, in the manufacturing method of the related art, the addition of ferroelectric particles may cause a decrease in high-rate characteristics. In consideration of the above-described circumstances, in the related art, it is difficult to discover the catalytic action of the ferroelectric particles.

In the manufacturing method according to [1], as described regarding the first step, the ferroelectric particles are attached to the negative electrode active material particles by mixing the negative electrode active material particles and the ferroelectric particles with each other substantially without the binder component being interposed between the negative electrode active material particles and the ferroelectric particles. In addition, the binder is mixed with the mixture (first composite particles) of the first step. As a result, by mixing the negative electrode active material particles and the ferroelectric particles with each other substantially without adding a binder component, the proportion of the ferroelectric particles directly attached to the negative electrode active material particles can be increased. Here, "binder component" refers to an adhesive resin component.

However, when the composite particles are dispersed in a solvent (to form "slurry" or "paste") after mixing, the ferroelectric particles are peeled off from the surfaces of the negative electrode active material particles, and the catalytic action cannot be exhibited. Therefore, in the manufacturing method according to [1], as described regarding the second to fourth steps, the negative electrode mixture layer can be formed without the formation of the slurry. As a result, the state where the ferroelectric particles are directly attached to the surfaces of the negative electrode active material particles can be maintained until the negative electrode mixture layer is obtained.

[2] It is preferable that a mixing amount of the ferroelectric particles is 5 mass % to 40 mass % with respect to a total mass of the negative electrode mixture layer. By adjusting the mixing amount to be 5 mass % or higher, the improvement of high-rate characteristics can be expected. By adjusting the mixing amount to be 40 mass % or lower, a decrease in the peeling strength of the negative electrode mixture layer can be suppressed.

[3] It is preferable that the ferroelectric particles are barium titanate particles. A significant catalytic action can be expected from barium titanate particles.

[4] It is preferable that the first step is performed by mixing the components through a dry process. As a result, the aggregation of the ferroelectric particles can be suppressed, and the proportion of the ferroelectric particles directly attached to the negative electrode active material particles can be increased.

[5] It is preferable that the second step includes: a step of forming second composite particles using the plural first composite particles; and a step of forming the granulated particles using the plural second composite particles. By forming the granulated particles through the two steps, the dispersibility of the binder may be improved, and the peeling strength of the negative electrode mixture layer may be improved.

According to the invention, a negative electrode for a nonaqueous electrolyte secondary battery having superior high-rate characteristics can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention (hereinafter, referred to as "the embodiment") will be described in detail. However, the embodiment is not limited to the following description. In the following description, "negative electrode for a nonaqueous electrolyte secondary battery" will be referred to simply as "negative electrode". "Nonaqueous electrolyte secondary battery" will also be referred to simply as "battery".

<Method of Manufacturing Negative Electrode for Nonaqueous Electrolyte Secondary Battery>

Figure 2:
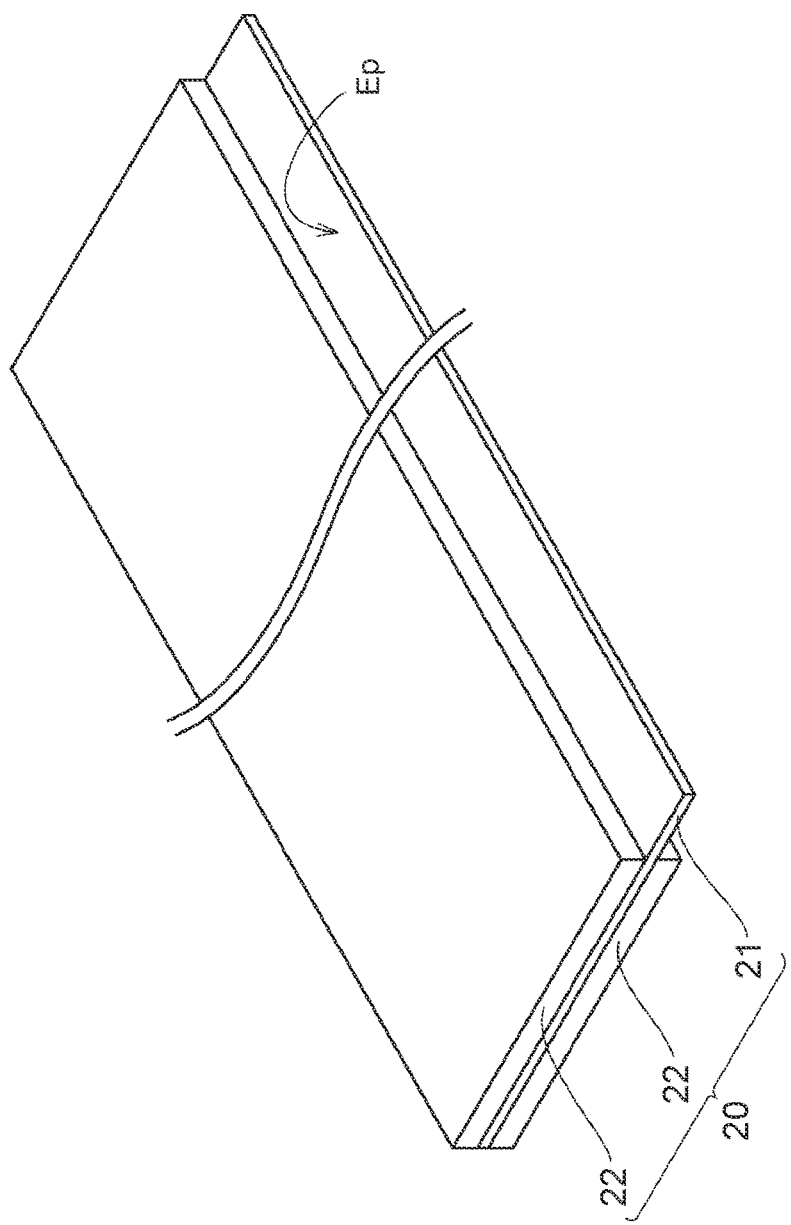
FIG. 2 is a schematic diagram showing a configuration example of the negative electrode for a nonaqueous electrolyte secondary battery according to the embodiment of the invention.

FIG. 2 is a schematic diagram showing a configuration example of a negative electrode according to the embodiment. A negative electrode 20 is an elongated belt-shaped sheet member. The negative electrode 20 includes: a negative electrode current collector foil 21; and a negative electrode mixture layer 22 that is arranged on both main surfaces of the negative electrode current collector foil 21. The negative electrode current collector foil 21 is, for example, a copper (Cu) foil. In the negative electrode 20, a foil exposure portion Ep where the negative electrode current collector foil 21 is exposed is provided for connection to an external terminal.

Figure 1:
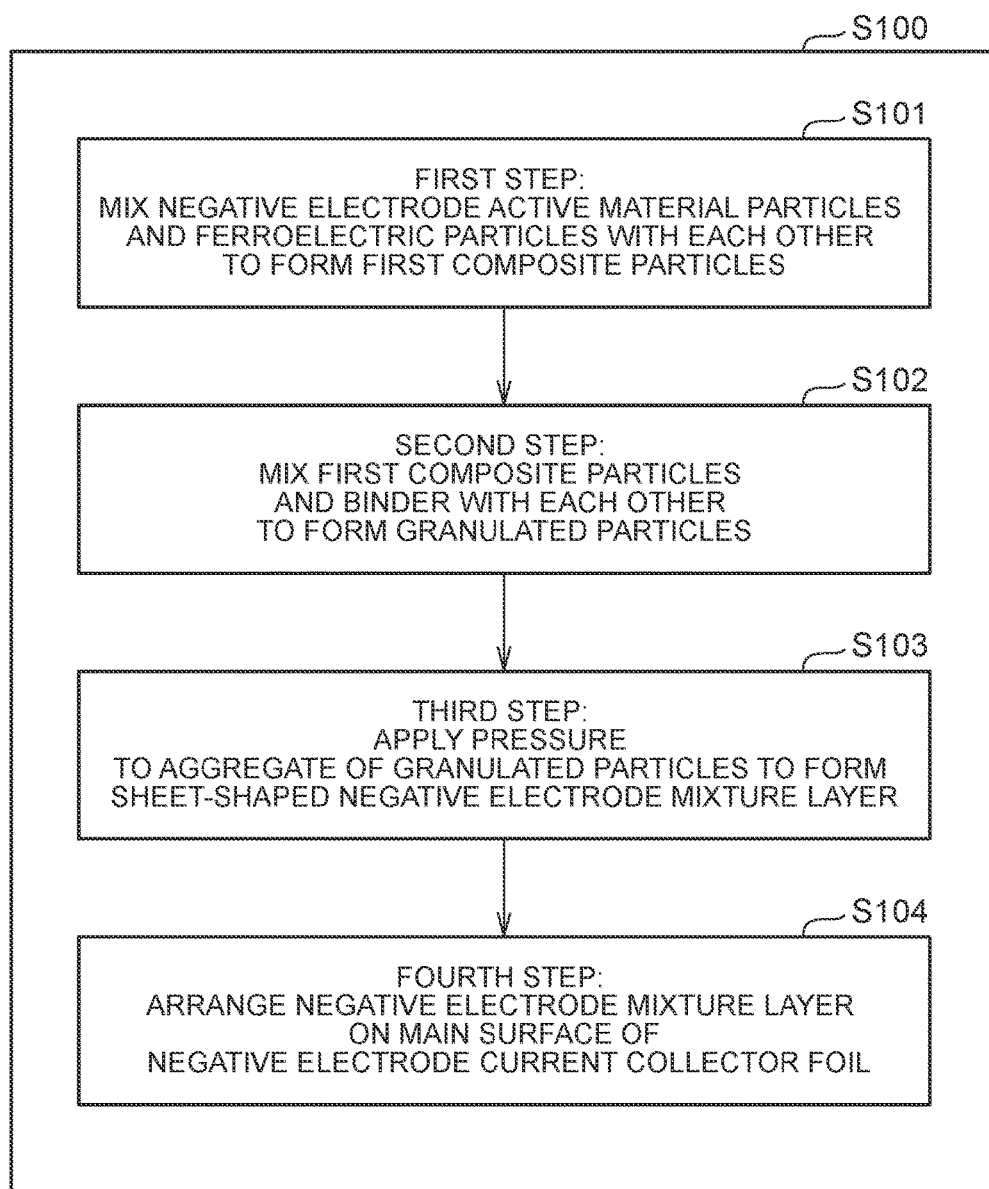
FIG. 1 is a flowchart showing the summary of a method of manufacturing a negative electrode for a nonaqueous electrolyte secondary battery according to an embodiment of the invention.

FIG. 1 is a flowchart showing the summary of a method of manufacturing the negative electrode according to the embodiment. As shown in FIG. 1, the method of manufacturing a negative electrode for a nonaqueous electrolyte secondary battery includes a first step (S101), a second step (S102), a third step (S103), and a fourth step (S104). Hereinafter, each step will be described.

<First Step (S101)>

In the first step, negative electrode active material particles and ferroelectric particles are mixed with each other to form first composite particles in which the ferroelectric particles are attached to the negative electrode active material particles. Here, each of the first composite particles refers to a composite particle in which one or more ferroelectric particles are attached to one negative electrode active material particle. As a specific operation in the first step, for example, using a mixer, powder of the negative electrode active material particles and powder of the ferroelectric particles may be mixed with each other. By mixing the negative electrode active material particles and the ferroelectric particles with each other substantially without adding a binder component, the proportion of the ferroelectric particles directly attached to the negative electrode active material particles can be increased.

The mixer is not particularly limited. The mixer may be, for example, a planetary mixer, HIGH-SPEED MIXER (product name, manufactured by EARTHTECHNICA Co., Ltd.), and HIGH FLEX GRAL (product name, manufactured by EARTHTECHNICA Co., Ltd.). Mixing conditions can be appropriately changed depending on the batch amount, the powder properties, and the like. However, it is preferable that the first step is performed by mixing the components through a dry process. That is, in the first step, it is preferable that a solvent is not used. When the components are mixed with each other using a wet method, the ferroelectric particles is not likely to be attached to the negative electrode active material particles due to aggregation of the ferroelectric particles. Whether or not the ferroelectric particles are attached to the negative electrode active material particles can be verified, for example, by observing the first composite particles with a scanning electron microscope (SEM).

<Ferroelectric Particles>

In this specification, the ferroelectric particles refer to particles formed of a material having a dielectric constant of 100 or higher. A higher dielectric constant of the ferroelectric particles is preferable. The dielectric constant of the ferroelectric particles is preferably 500 or higher and more preferably 1000 or higher. The upper limit of the dielectric constant of the ferroelectric particles is not particularly limited. The upper limit of the dielectric constant of the ferroelectric particles is, for example, 10000.

In consideration of the chemical stability in the battery, it is preferable that the ferroelectric particles are formed of an inorganic compound. Examples of the ferroelectric particles which can be used include barium titanate ($BaTiO_3$) particles, lithium niobate ($LiNbO_3$) particles, potassium niobate ($KNbO_3$) particles, cadmium niobate ($Cd_2Nb_2O_7$) particles, and titanium oxide particles ($TiO_2$). Among these ferroelectric particles, one kind may be used alone, or two or more kinds may be used in combination. That is, the ferroelectric particles may be at least one selected from $BaTiO_3$ particles, $LiNbO_3$ particles, $KNbO_3$ particles, $Cd_2Nb_2O_7$ particles, and TiO$_2$ particles. From the viewpoint of dielectric constant, it is more preferable that the ferroelectric particles are BaTiO$_3$ particles.

The powder properties of the ferroelectric particles are not particularly limited. However, in order to effectively attach the ferroelectric particles to the negative electrode active material particles, it is preferable that D50 of the ferroelectric particles is set to be less than D50 of the negative electrode active material particles. In this specification, "D50" refers to a particle size corresponding to a cumulative value of 50% in a volume particle size distribution measured using a laser diffraction scattering method. D50 of the ferroelectric particles may be set to be, for example, about 0.01 times to 0.1 times D50 of the negative electrode active material particles. D50 of the ferroelectric particles is, for example, 100 nm to 1.0 μm.

It is preferable that the mixing amount of the ferroelectric particles is 5 mass % to 40 mass % with respect to the desired total mass of the negative electrode mixture layer. By adjusting the mixing amount to be 5 mass % or higher, the improvement of high-rate characteristics can be expected. From this point of view, the lower limit of the mixing amount is more preferably 10 mass % and still more preferably 20 mass %. By adjusting the mixing amount to be 40 mass % or lower, a decrease in the peeling strength of the negative electrode mixture layer can be suppressed. From this point of view, the upper limit of the mixing amount is more preferably 30 mass %.

<Negative Electrode Active Material Particles>

The negative electrode active material particles are not particularly limited. For example, the negative electrode active material particles may be particles formed of a carbon negative electrode active material such as graphite or coke, or may be particles formed of an alloy negative electrode active material of silicon (Si), tin (Sn), and the like. D50 of the negative electrode active material particles is, for example, about 1 μm to 30 μm and preferably 5 μm to 20 μm. The mixing amount of the negative electrode active material particles may be, for example, 56 mass % to 96 mass % with respect to the desired total mass of the negative electrode mixture layer.

<Second Step (S102)>

The second step is performed after the first step. In the second step, the first composite particles and a binder are mixed with each other to form granulated particles. The granulated particles contain the plural first composite particles. The granulated particles may be directly formed by granulating the first composite particles or may be formed through the following multi-step granulation. That is, the second step may includes: a step of forming second composite particles using the plural first composite particles; and a step of forming the granulated particles using the plural second composite particles.

For example, in the second step, first, a step of forming second composite particles by mixing the first composite particles and a first binder with each other may be performed. The second composite particles contain the plural first composite particles. In the second composite particles, adjacent first composite particles are bonded to each other through the first binder. In the second composite particles, the first binder is attached to portions of surfaces of the negative electrode active material particles to which the ferroelectric particles are not attached, or is attached to the ferroelectric particles attached to the negative electrode active material particles. As a specific operation in this step, for example, using a mixer, powder of the first composite particles, powder of the first binder, and a solvent may be mixed with each other.

<First Binder>

It is preferable that the first binder exhibits a thickening effect when being dispersed in the solvent. By mixing the components with each other while applying a given amount of shearing stress thereto using the binder which exhibits a thickening effect, the density of the second composite particles or the granulated particles may be increased. For example, carboxymethyl cellulose (CMC), polyacrylic acid (PAA), polyacrylonitrile (PAN), or polyvinylidene fluoride (PVDF) can be used as the first binder. The first binder may be powder or may be in the form of being dispersed or dissolved in the solvent in advance. When the first binder is used as powder, D50 of the first binder may be set to be about 0.01 times to 1.0 time D50 of the negative electrode active material particles. As a result, the area of portions of the surfaces of the ferroelectric particles covered with the first binder can be reduced, which may further reduce battery resistance. D50 of the first binder which is powder is, for example, 200 μm or less, preferably 0.1 μm to 10 μm, and more preferably 0.1 μm to 1 μm. The mixing amount of the first binder may be, for example, 0.5 mass % to 2 mass % with respect to the desired total mass of the negative electrode mixture layer.

The solvent may be appropriately selected according to the kind of the first binder. Examples of the solvent which can be used include water, N-methyl-2-pyrrolidone (NMP), dimethylformamide (DMF), and dimethylacetamide (DMA). The amount of the solvent used during the formation of the second composite particles may be adjusted such that, for example, the solid content concentration of the second composite particles is 90 mass % to 95 mass %. Within the above-described range, a predetermined amount of shearing stress may be applied to the mixture while suppressing the aggregation of the ferroelectric particles.

After the second composite particles are formed as described above, a step of forming granulated particles by mixing the second composite particles and a second binder with each other may be performed. The granulated particles obtained as described above contain the plural second composite particles. In the granulated particles, adjacent second composite particles may be bonded to each other through the first binder or may be bonded to each other through the second binder which is different from the first binder. As a specific operation in this step, for example, using a mixer, powder of the second composite particles, a solvent may be mixed with each other. Alternatively, powder of the second composite particles, powder of the second binder, and a solvent may be mixed with each other.

<Second Binder>L3-P3

As the second binder, a binder having higher binding properties than the first binder is preferably used because the peeling strength of the negative electrode mixture layer can be improved. For example, styrene-butadiene rubber (SBR), acrylic rubber (AR), urethane rubber (UR), or polytetrafluoroethylene (PTFE) can be used as the second binder. The second binder may be powder or may be in the form of being dispersed or dissolved in the solvent in advance. The mixing amount of the second binder may be, for example, 0.5 mass % to 2 mass % with respect to the desired total mass of the negative electrode mixture layer.

As the solvent, the solvents described above as examples can be used. The amount of the solvent used during the formation of the granulated particles may be adjusted such that, for example, the solid content concentration of the granulated particles is 70 mass % or higher and lower than 90 mass %. As a result, dense granulated particles can be formed while suppressing the aggregation of the ferroelectric particles.

After the formation of the granulated particles, the particle distribution and particle shape of the granulated particles may be adjusted by classification, extrusion granulation, and the like.

<Third Step (S103)>

Figure 3:
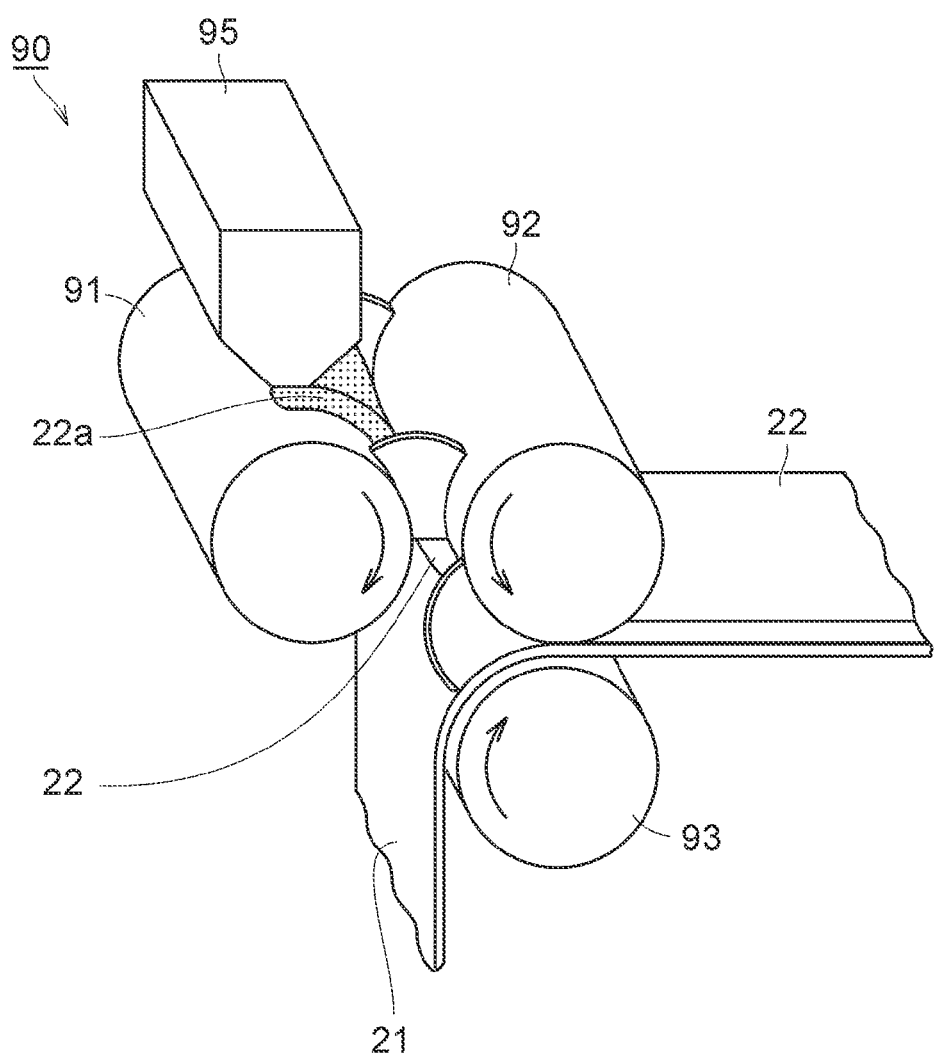
FIG. 3 is a schematic diagram showing an example of a third step and a fourth step according to the embodiment of the invention.

In the third step, pressure is applied to an aggregate of the granulated particles to form a sheet-shaped negative electrode mixture layer. The aggregate (powder) of the granulated particles is also called "granulated body". FIG. 3 is a schematic diagram showing an example of the third step and the fourth step (described below). These steps can be performed using a transfer forming device 90 shown in FIG. 3. Hereinafter, the third step and the fourth step will be described along the operation of the transfer forming device 90.

The aggregate of the granulated particles obtained in the third step is supplied to a feeder 95 of the transfer forming device 90. An aggregate 22a of the granulated particles is supplied from the feeder 95 onto an A roller 91 or a B roller 92. In FIG. 3, arrows indicate rotating directions of the respective roller members. The aggregate 22a of the granulated particles is transported along the rotating direction of the A roller 91 or the B roller 92 and reaches a gap between the A roller 91 and the B roller 92. In this gap, pressure is applied from the A roller 91 and the B roller 92 to the aggregate 22a of the granulated particles. As a result, the aggregate 22a of the granulated particles is formed into the sheet-shaped negative electrode mixture layer 22. The coating mass (mass per unit area) and thickness of the negative electrode mixture layer 22 are adjusted by the gap between the A roller 91 and the B roller 92. The coating mass and thickness of the negative electrode mixture layer can be appropriately adjusted according to the specification of a battery. The thickness of the negative electrode mixture layer may be, for example, 50 μm to 150 μm. In this example, the aggregate of the granulated particles is formed into a sheet shape using the two rollers. However, a forming method is not limited to this example as long as the aggregate of the granulated particles can be formed into a sheet shape. For example, the sheet-shaped negative electrode mixture layer may be formed using a flat pressing machine.

<Fourth Step (S104)>

In the fourth step, the negative electrode mixture layer is arranged on a main surface of the negative electrode current collector foil. As shown in FIG. 3, the negative electrode mixture layer 22 obtained in the third step is transported along the rotating direction of the B roller 92. The negative electrode current collector foil 21 is transported along the rotating direction of a C roller 93. In a gap between the B roller 92 and the C roller 93, pressure is applied from the B roller 92 and the C roller 93 to the negative electrode mixture layer 22 and the negative electrode current collector foil 21. As a result, the negative electrode mixture layer 22 is transferred to the main surface of the negative electrode current collector foil 21 and is pressed against the main surface of the negative electrode current collector foil 21. In this way, the negative electrode mixture layer 22 is arranged on the main surface of the negative electrode current collector foil 21. Next, using a hot air drying furnace, the solvent remaining in the negative electrode mixture layer may be evaporated. Likewise, among the main surfaces of the negative electrode current collector foil 21, the negative electrode mixture layer may also be arranged on the other main surface opposite to the main surface where the negative electrode mixture layer 22 is formed. Next, by processing the negative electrode mixture layer and the negative electrode current collector foil to obtain predetermined dimensions, the negative electrode 20 shown in FIG. 2 is completed.

In the negative electrode 20, a state where the ferroelectric particles are attached to surfaces of the negative electrode active material particles is maintained. Therefore, the ferroelectric particles sufficiently exhibit a catalytic action in an intercalation reaction of Li ions into the negative electrode active material particles. As a result, the improvement of high-rate characteristics can be expected. In particular, in a low-temperature environment where reaction resistance is high, a significant increase in the effect can be expected.

<Method Of Manufacturing Nonaqueous Electrolyte Secondary Battery>

Figure 4:
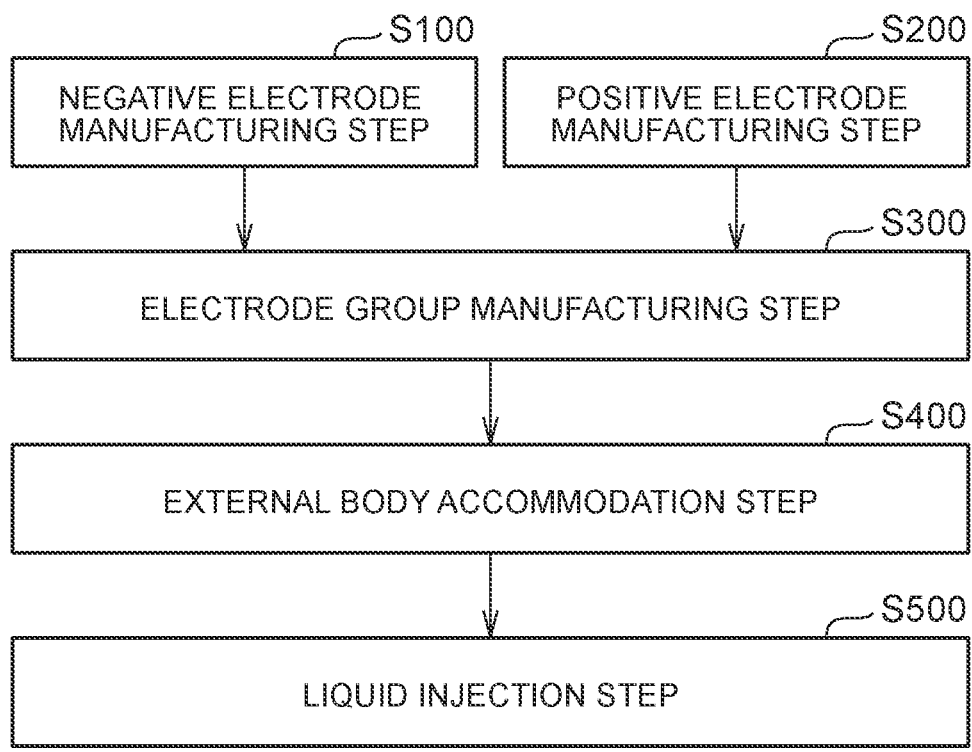
FIG. 4 is a flowchart showing the summary of a method of manufacturing a nonaqueous electrolyte secondary battery according to the embodiment of the invention.

According to the embodiment, a method of manufacturing a nonaqueous electrolyte secondary battery is provided. FIG. 4 is a flowchart showing the summary of the manufacturing method. The method of manufacturing a nonaqueous electrolyte secondary battery includes, a negative electrode manufacturing step (S100), a positive electrode manufacturing step (S200), an electrode group manufacturing step (S300), an external body accommodation step (S400), and a liquid injection step (S500). Among these steps, the negative electrode manufacturing step (S100) has been described above in "method of manufacturing a negative electrode for a nonaqueous electrolyte secondary battery", and thus the same description will not be repeated. Hereinafter, the steps other than the negative electrode manufacturing step will be described.

<Positive Electrode Manufacturing Step (S200)>

Figure 5:
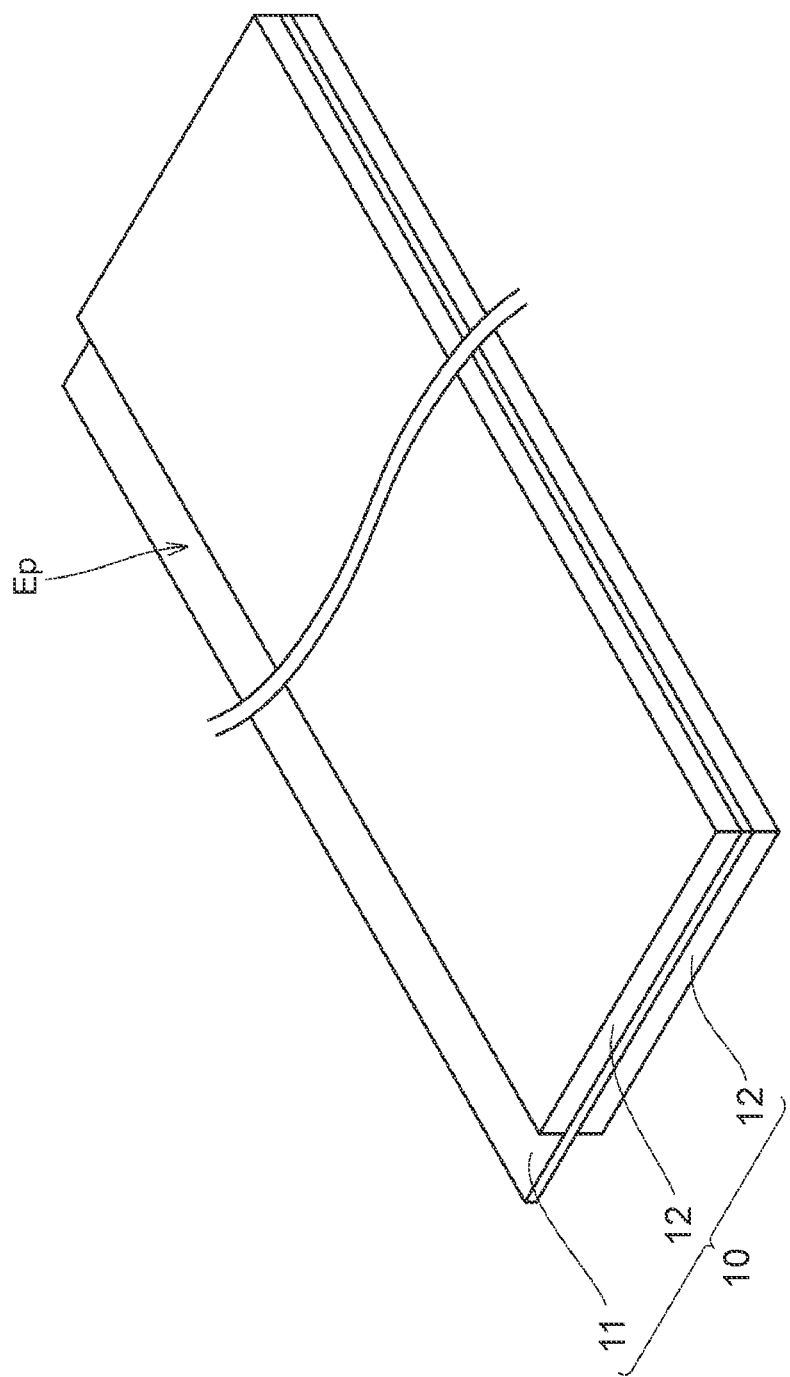
FIG. 5 is a schematic diagram showing a configuration example of a positive electrode according to the embodiment of the invention.

FIG. 5 is a schematic diagram showing a configuration example of a positive electrode according to the embodiment. In the positive electrode manufacturing step, for example, a positive electrode 10 shown in FIG. 5 is manufactured. The positive electrode 10 includes: a positive electrode current collector foil 11; and a positive electrode mixture layer 12 that is arranged on both main surfaces of the positive electrode current collector foil 11. The positive electrode current collector foil 11 is, for example, an aluminum (Al) foil. In the positive electrode 10, a foil exposure portion Ep where the positive electrode current collector foil 11 is exposed is provided for connection to an external terminal. The thickness of the positive electrode mixture layer may be, for example, about 50 μm to 150 μm.

The positive electrode 10 can be manufactured using a well-known method of the related art. The positive electrode 10 can be manufactured, for example, as follows. A positive electrode mixture slurry containing a positive electrode active material is prepared. The positive electrode mixture slurry is applied to both main surfaces of the positive electrode current collector foil 11. By drying the slurry coating film, the positive electrode mixture layer 12 is formed. The positive electrode mixture layer 12 is pressed to adjust the thickness. The positive electrode current collector foil 11 and the positive electrode mixture layer 12 are processed to have predetermined dimensions.

The positive electrode mixture slurry can be prepared by kneading a positive electrode active material, a conductive material, and a binder with each other in a solvent. As the positive electrode active material, for example, $LiCoO_2$, $LiNiO_2$, a compound represented by the formula $LiNi_aCo_bO_2$ (wherein, a+b=1, 0<a<1, and 0<b<1), $LiMnO_2$, $LiMn_2O_4$, a compound represented by the formula $LiNi_a$ $Co_bMn_cO_2$ (wherein, a+b+c=1, 0<a<1, 0<b<1, and 0<c<1), or $LiFePO_4$ can be used. As the compound represented by the formula $LiNi_aCo_bMn_cO_2$, for example, $LiNi_{1/3}Co_{1/3}Mn_{1/3}O_2$ can be used.

For example, the conductive material may be acetylene black (AB) or graphite. The mixing amount of the conductive material may be, for example, about 1 mass % to 10 mass % with respect to the total mass of the positive electrode mixture layer. The binder may be, for example, PVDF or PTFE. The mixing amount of the binder may be, for example, about 1 mass % to 10 mass % with respect to the total mass of the positive electrode mixture layer. The solvent may be, for example, NMP.

<Electrode Group Manufacturing Step (S300)>

Figure 6:
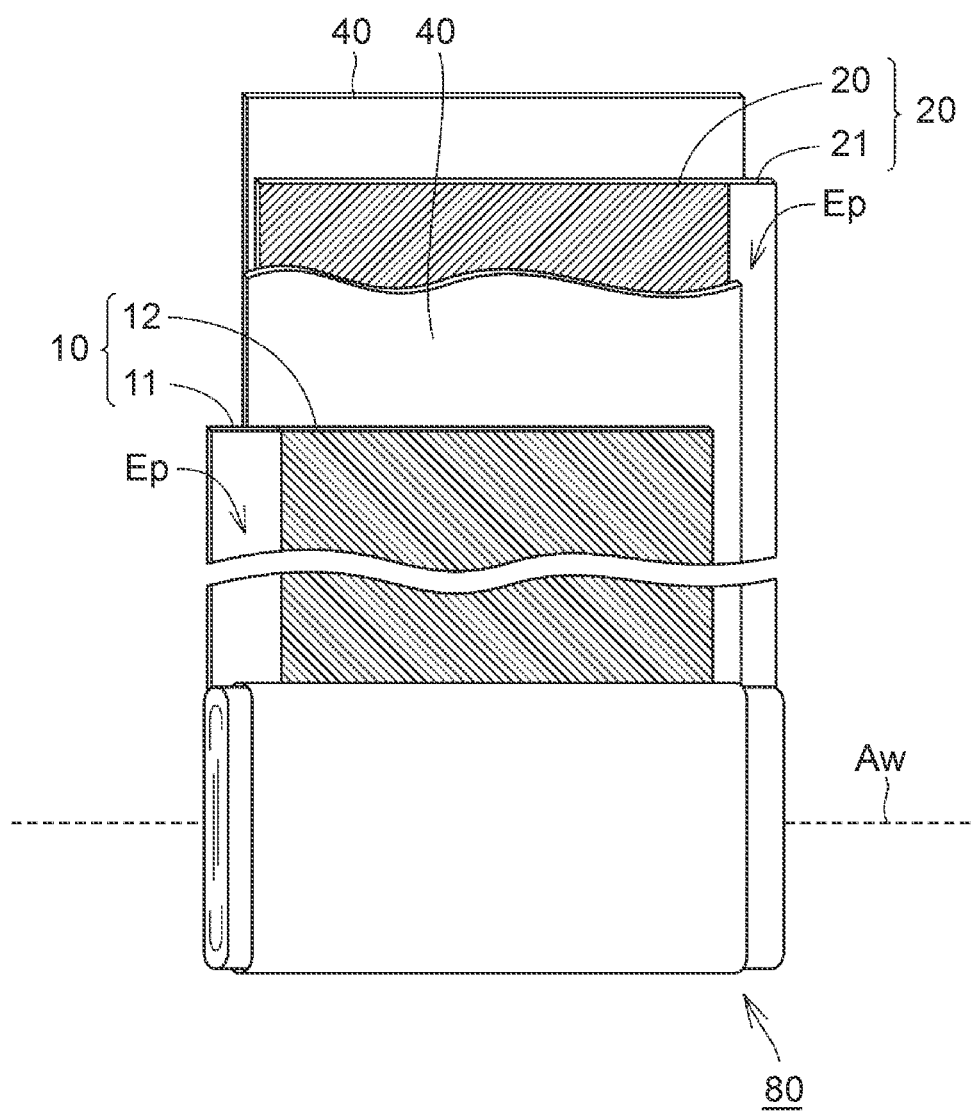
FIG. 6 is a schematic diagram showing a configuration example of an electrode group according to the embodiment of the invention.

FIG. 6 is a schematic diagram showing a configuration example of an electrode group according to the embodiment. In the electrode group manufacturing step, an electrode group 80 shown in FIG. 6 is manufactured. For example, the positive electrode 10 and the negative electrode 20 are laminated with separators 40 interposed therebetween to obtain a laminate, and the laminate is wound. As a result, an elliptical wound electrode group is obtained. At this time, the foil exposure portions Ep of the positive electrode 10 and the negative electrode 20 are arranged in end portions in a direction moving along a winding axis Aw. The wound electrode group is pressed such that the external shape thereof is processed into a flat shape. As a result, the electrode group 80 is obtained.

The separator may be, for example, a microporous membrane formed of a polyolefin material. Specifically, the separator may be a microporous membrane formed of polyethylene (PE), polypropylene (PP), or the like. The separator may have a single-layer structure or a multi-layer structure. The thickness of the separator may be, for example, 5 μm to 40 μm. The pore size and porosity of the separator may be appropriately adjusted such that the air permeability is a desired value.

<External Body Accommodation Step (S400)>

Figure 7:
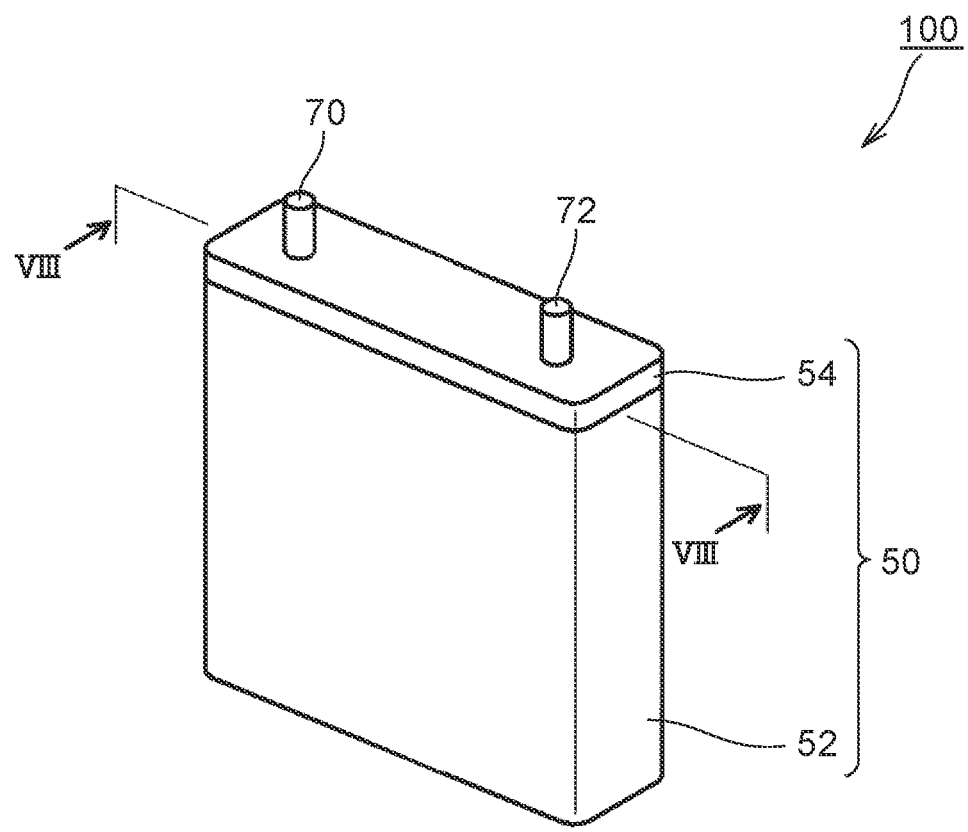
FIG. 7 is a schematic diagram showing a configuration example of a nonaqueous electrolyte secondary battery according to the embodiment of the invention.
Figure 8:
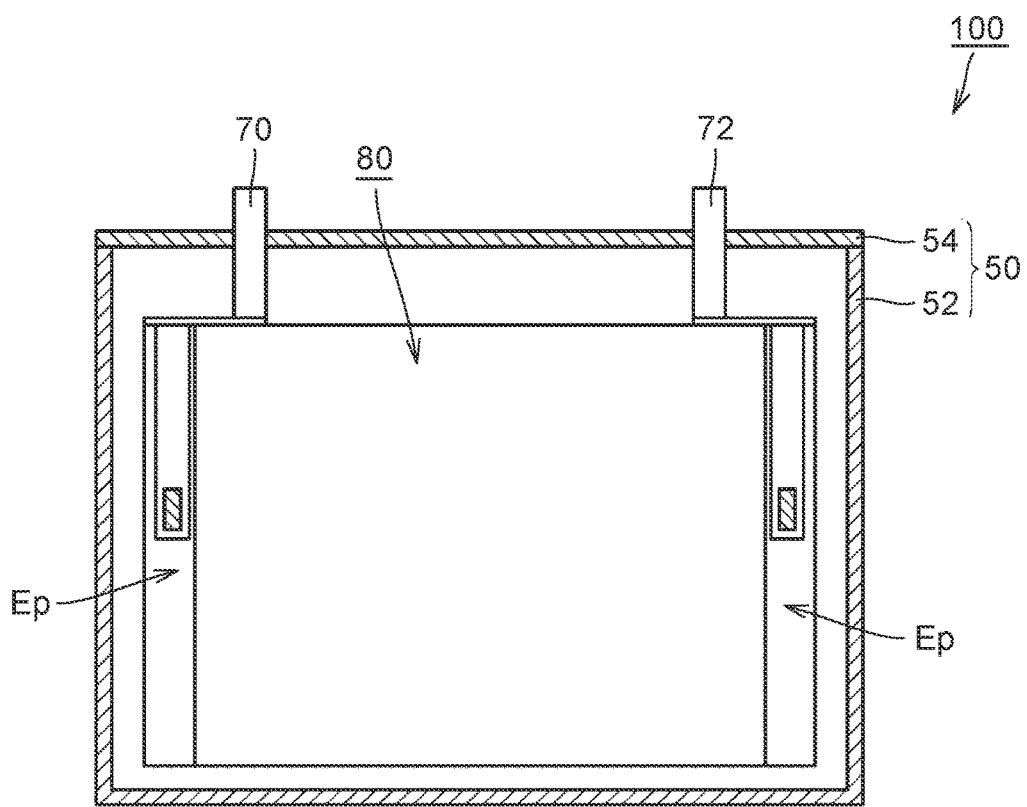
FIG. 8 is a schematic sectional view taken along line VIII-VIII of FIG. 7.

FIG. 7 is a schematic diagram showing a configuration example of a battery according to the embodiment. FIG. 8 is a schematic sectional view taken along line VIII-VIII of FIG. 7. In the external body accommodation step, the electrode group 80 shown in FIG. 8 is accommodated in the external body 50. The external body 50 includes a square case 52 and a lid 54. The external body 50 is formed of, for example, an Al alloy. A positive electrode terminal 70 and a negative electrode terminal 72 are provided on the lid 54. In the external body 50, for example, a safety valve, a current interrupt device, and a liquid injection hole (all of which are not shown) may be provided. In a state where the positive electrode terminal 70 and the negative electrode terminal 72 are connected to each other, the electrode group 80 is accommodated in the square case 52. The square case 52 and the lid 54 are joined to each other by, for example, laser welding.

<Liquid Injection Step (S500)>

In the liquid injection step, an electrolytic solution is injected into the external body. The electrolytic solution can be injected, for example, through a liquid injection hole provided on the external body.

The electrolytic solution is an electrolytic solution in which a supporting electrolyte is dissolved in a nonaqueous solvent. Examples of the nonaqueous solvent which can be used include cyclic carbonates such as ethylene carbonate (EC), propylene carbonate (PC), butylene carbonate (BC) and γ-butyrolactone (γBL); and chain carbonates such as dimethyl carbonate (DMC), ethyl methyl carbonate (EMC), and diethyl carbonate (DEC). Among these nonaqueous solvents, one kind may be used alone, or two or more kinds may be used in combination. When a mixture of a cyclic carbonate and a chain carbonate is used, a volume ratio of the cyclic carbonate to the chain carbonate is preferably about 1:9 to 5:5.

Examples of the supporting electrolyte include Li salts such as $LiPF_6$, $LiBF_4$, $LiClO_4$, $LiAsF_6$, $Li(CF_3SO_2)_2N$, and $LiCF_3SO_3$. Among these supporting electrolytes, one kind may be used alone, or two or more kinds may be used in combination. The concentration of the supporting electrolyte may be about 0.5 mol/L to 2.0 mol/L.

By sealing the liquid injection hole with predetermined means after the injection of the electrolytic solution, the external body 50 is sealed. In this way, a nonaqueous electrolyte secondary battery 100 can be manufactured.

Hereinabove, the embodiment has been described using the square battery as an example. However, the embodiment is not limited to the square battery. The embodiment may be applied to, for example, a cylindrical battery or a laminate battery.

Hereinafter, the embodiment will be described using Examples. However, the embodiment is not limited to the following Examples.

[Experiment 1: Investigation on Method of Adding Ferroelectric Particles]

Negative electrode and batteries were manufactured as described below under various conditions. Here, Manufacturing Condition A corresponds to Examples, and Manufacturing Conditions B and C correspond to Comparative Examples.

<Manufacturing Condition A>]

Under Manufacturing Condition A, five negative electrodes were manufactured while changing the mixing amount of ferroelectric particles to 5 mass %, 10 mass %, 20 mass %, 30 mass %, and 40 mass % with respect to the total mass of a negative electrode mixture layer.

First, the following materials were prepared.
Negative electrode active material particles: graphite
Ferroelectric particles: $BaTiO_3$ particles
First binder: CMC (D50: 200 μm)
Second binder: SBR
Solvent: water
Negative electrode current collector foil: Cu foil 1. First Step (S101)

As a mixer, a planetary mixer was prepared. The negative electrode active material particles and the ferroelectric particles were added to a mixing container of the planetary mixer and were dried through a dry process. As a result, first composite particles were formed in which the ferroelectric particles were attached to the negative electrode active material particles. Here, the mixing amount of the ferroelectric particles was 5 mass % with respect to the desired total mass of the negative electrode mixture layer.

2. Second Step (S102)

The first binder and the solvent were added to the mixing container, and the components were further mixed with each other. As a result, the first binder was attached to the first composite particles to form second composite particles. The amount of the solvent was adjusted such that the solid content concentration of the second composite particles was 92 mass %.

The second binder and the solvent were added to the mixing container, and the components were further mixed with each other. As a result, granulated particles were formed using the plural second composite particles. The amount of the solvent was adjusted such that the solid content concentration of the granulated particles was 75 mass %.

3. Third Step (S103)

Using the transfer forming device 90 shown in FIG. 3, an aggregate of the granulated particles obtained as described above was formed into a sheet-shaped negative electrode mixture layer as described above.

4. Fourth Step (S104)

Using the transfer forming device 90 shown in FIG. 3, the negative electrode mixture layer obtained as described above was arranged on a main surface of the negative electrode current collector foil as described above. As a result, a negative electrode was manufactured in which the mixing amount of the ferroelectric particles was 5 mass % with respect to the total mass of the negative electrode mixture layer. Further, negative electrodes were manufactured using the same method as described above, except that the mixing amount was changed to 10 mass %, 20 mass %, 30 mass %, and 40 mass %.

<Manufacturing Condition B>

Manufacturing Condition B corresponds to Comparative Examples in which a negative electrode mixture layer was formed of a slurry without forming granulated particles. That is, under Manufacturing Condition B, the first to fourth steps according to the embodiment were not performed. Specifically, a negative electrode was manufactured as follows.

The negative electrode active material particles, the ferroelectric particles, the first binder, and the solvent were collectively put into the mixing container of the planetary mixer and were kneaded with each other. Next, the second binder and the solvent were further added and were kneaded with each other. As a result, a negative electrode mixture slurry was formed. The solid content concentration of the negative electrode mixture slurry was adjusted to 50 mass %. Using a die coater, the negative electrode mixture slurry was applied to a main surface of the negative electrode current collector foil and was dried. As a result, a negative electrode mixture layer was formed. In this way, five negative electrodes were manufactured while changing the mixing amount of ferroelectric particles to 5 mass %, 10 mass %, 20 mass %, 30 mass %, and 40 mass % with respect to the total mass of a negative electrode mixture layer.

<Manufacturing Condition C>

Manufacturing Condition C corresponds to Comparative Examples in which a negative electrode mixture layer was formed of a slurry without forming granulated particles. In addition, Manufacturing Condition C corresponds to Comparative Examples in which the ferroelectric particles were not added to the negative electrode mixture layer. Specifically, negative electrodes in which the mixing amount of the ferroelectric particles was 0 mass % with respect to the total mass of the negative electrode mixture layer were manufactured using the same method as under Manufacturing Condition B, except that the ferroelectric particles were not added.

<Manufacturing of Nonaqueous Electrolyte Secondary Battery>

Using the various negative electrodes manufactured as described above, batteries were manufactured as described above (for example, refer to FIG. 4). The battery designs were appropriately changed depending on the mixing amount of the ferroelectric particles.

<Evaluation>

1. Measurement of Low-Temperature Charging Resistance

Figure 9:
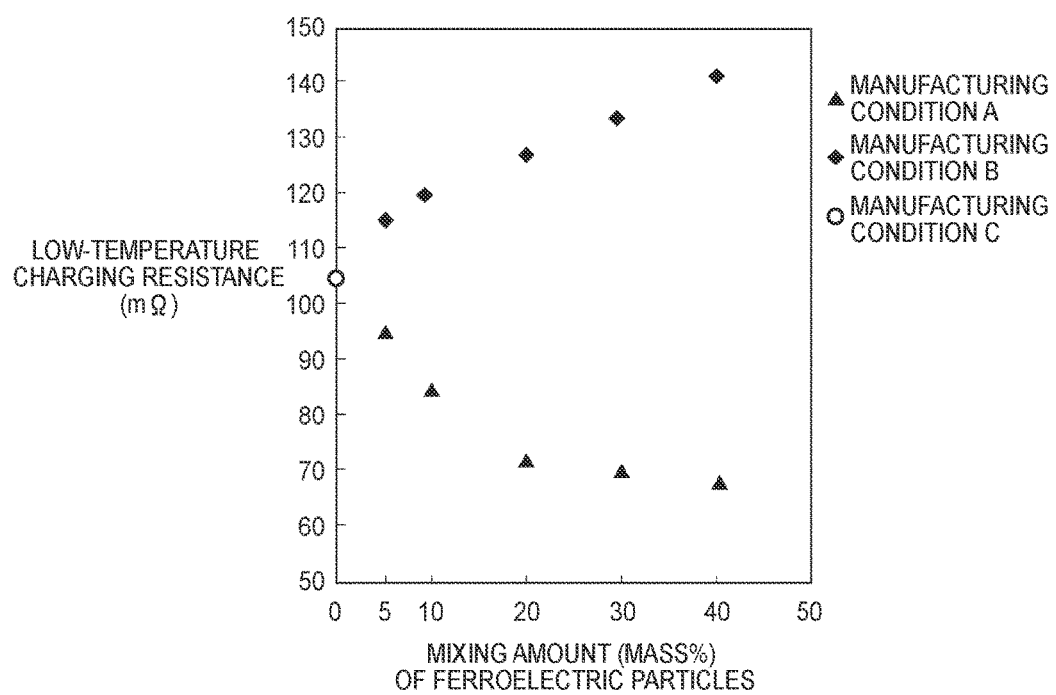
FIG. 9 is a graph showing an example of a relationship between the mixing amount of ferroelectric particles and a low-temperature charging resistance.

The state of charge (SOC) of each of the batteries was adjusted to 60%. The battery was arranged in a thermostatic chamber set to −15° C. By performing pulse charging in the same environment as described above, an increase in voltage was measured. Low-temperature charging resistance was calculated based on a relationship between the current value and the increase in voltage during the pulse charging. The results are shown in FIG. 9. Here, the lower the low-temperature charging resistance, the higher the high-rate characteristics.

FIG. 9 is a graph showing an example of a relationship between the mixing amount of the ferroelectric particles and the low-temperature charging resistance. In FIG. 9, the horizontal axis represents the mixing amount of the ferroelectric particles, and the vertical axis represents the low-temperature charging resistance. As can be seen from FIG. 9, under Manufacturing Condition A according to Examples, the larger the mixing amount of the ferroelectric particles, the lower the low-temperature charging resistance. Under Manufacturing Condition A, the abundance of the ferroelectric particles directly attached to the surfaces of the negative electrode active material particles were large. Therefore, it is considered that the catalytic action of the ferroelectric particles was exhibited.

On the other hand, under Manufacturing Condition B according to Comparative Examples, the larger the mixing amount of the ferroelectric particles, the higher the low-temperature charging resistance. Under Manufacturing Condition B, the negative electrode active material particles, the ferroelectric particles, and the binder were collectively mixed with each other during the manufacturing of the negative electrode. Therefore, it is considered that, since the binder was interposed between the negative electrode active material particles and the ferroelectric particles, the catalytic action of the ferroelectric particles was reduced. Further, it is considered that, since the negative electrode active material particles, the ferroelectric particles, and the binder were dispersed in the solvent to form the slurry, the ferroelectric particles were not likely be attached to the negative electrode active material particles due to aggregation of the ferroelectric particles, or the ferroelectric particles were likely to be peeled off from the surfaces of the negative electrode active material particles. As a result, it is considered that the ferroelectric particles functioned as simple resistors to cause an increase in resistance.

As can be seen from FIG. 9, under Manufacturing Condition A, when the mixing amount of the ferroelectric particles was 5 mass % to 40 mass % with respect to the total mass of the negative electrode mixture layer, the effect of reducing the low-temperature charging resistance was verified. The larger the mixing amount of the ferroelectric particles, the lower the low-temperature charging resistance. When the mixing amount of the ferroelectric particles is 20 mass % or higher, the low-temperature charging resistance is extremely low. Therefore, it can be said that the mixing amount of the ferroelectric particles is preferably 5 mass % or higher, more preferably 10 mass % or higher, and still more preferably 20 mass % or higher.

2. Measurement of Peeling Strength of Negative Electrode Mixture Layer

Figure 10:
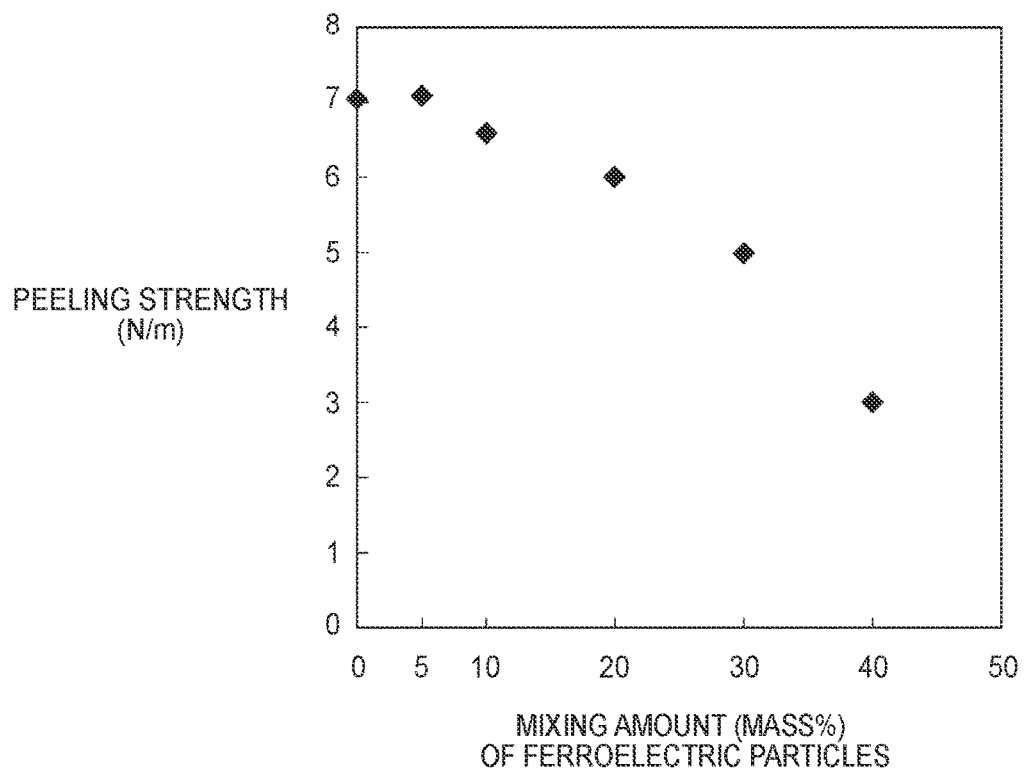
FIG. 10 is a graph showing an example of a relationship between the mixing amount of ferroelectric particles and the peeling strength of a negative electrode mixture layer.

Regarding each of the negative electrodes manufactured under Manufacturing Condition A, the peeling strength of the negative electrode mixture layer was measured. The peeling strength was measured using a 90° peeling test based on "JIS Z 0237: Testing methods of pressure-sensitive adhesive tapes and sheets". The results are shown in FIG. 10. As the peeling strength increases, the negative electrode mixture layer is less likely to be peeled from the negative electrode current collector foil, which is preferable.

FIG. 10 is a graph showing an example of a relationship between the mixing amount of the ferroelectric particles and the peeling strength of the negative electrode mixture layer. In FIG. 10, the horizontal axis represents the mixing amount of the ferroelectric particles, and the vertical axis represents the peeling strength of the negative electrode mixture layer. As can be seen from FIG. 10, as the mixing amount of the ferroelectric particles increases, the peeling strength of the negative electrode mixture layer gradually decreases; and when the mixing amount of the ferroelectric particles exceeds 30 mass %, the peeling strength of the negative electrode mixture layer significantly decreases. Accordingly, in consideration of the peeling strength, it can be said that the mixing amount of the ferroelectric particles is preferably 30 mass % or lower. In particular, in a battery including a wound electrode group where the effect of the peeling strength is high, it is preferable that the mixing amount is set to be 30 mass % or lower.

<Experiment 2: Investigation on D50 of First Binder>

In Experiment 2, in a state where the mixing amount of the ferroelectric particles was fixed to 20 mass %, the effect of D50 of the first binder was investigated. Here, Manufacturing Conditions A1 and A2 correspond to Examples, and Manufacturing Condition D corresponds to Comparative Examples.

<Manufacturing Condition A1>

Under the same condition as Manufacturing Condition A, a negative electrode was manufactured using CMC having a D50 of 200 µm as the first binder.

<Manufacturing Condition A2>

A negative electrode was manufactured using the same method as under Manufacturing Condition A1, except that CMC having a D50 of 1 µm was used as the first binder.

<Manufacturing Condition D>

Manufacturing Condition D corresponds to Comparative Examples in which the first step according to the embodiment was not performed. Specifically, a negative electrode was manufactured as follows.

The negative electrode active material particles, the ferroelectric particles, and the first binder were collectively put into the mixing container of the planetary mixer, and the components were mixed with each other through a dry process. As the first binder, CMC having a D50 of 200 µm was used as the first binder. The solvent was added, and the components were further mixed with each other. As a result, composite particles were formed. Next, the second binder and the solvent were added to the mixing container, and the components were further mixed with each other. As a result, granulated particles were formed using the plural composite particles. Next, under the same condition as Manufacturing Condition A, an aggregate of the granulated particles was formed into a sheet-shaped negative electrode mixture layer. The negative electrode mixture layer was arranged on a main surface of the negative electrode current collector foil.

<Evaluation>

Figure 11:
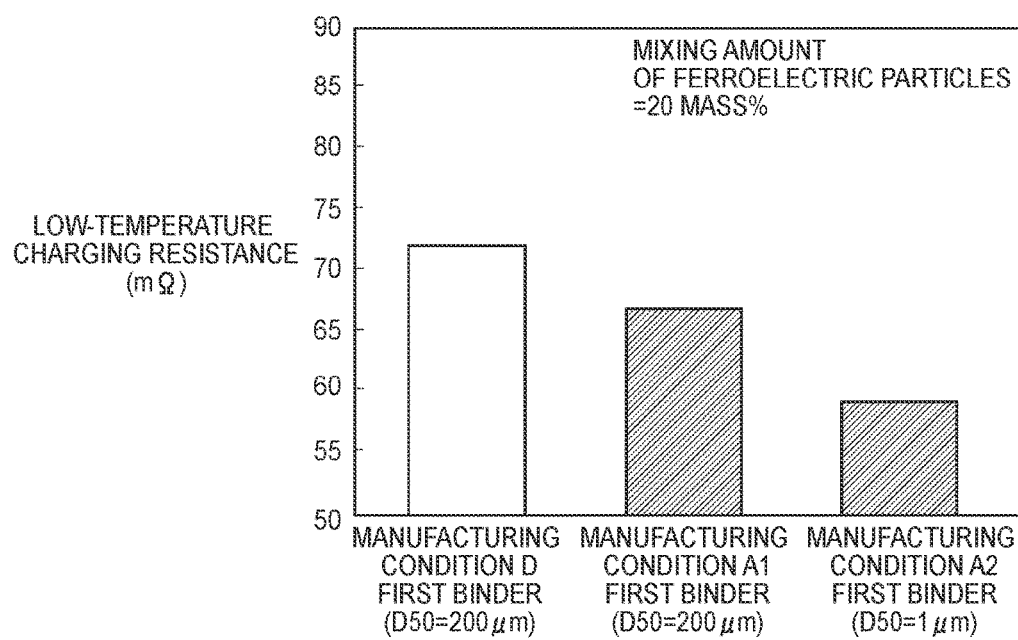
FIG. 11 is a graph showing a relationship between D50 of a binder and the low-temperature charging resistance.

Using the same method as in Experiment 1, a battery was obtained using the negative electrode obtained as described above, and low-temperature charging resistance thereof was measured. The results are shown in FIG. 11. FIG. 11 is a graph showing a relationship between D50 of the first binder and the low-temperature charging resistance. It was found from FIG. 11 that low-temperature charging resistance can be reduced by reducing the particle size of CMC as the first binder. It is considered that the ferroelectric particles are not likely to be covered with CMC by reducing the particle size of CMC to be less than that of the negative electrode active material particles or the first composite particles.

D50 of CMC under Manufacturing Condition D and D50 of CMC under Manufacturing Condition A1 were the same. Further, under Manufacturing Condition D, the first step of the embodiment was not performed, but a negative electrode mixture layer was formed without the formation of the slurry. Nevertheless, as shown in FIG. 11, the low-temperature charging resistance was higher than that under Manufacturing Condition A1 according to Examples. It can be considered from the above results that, when the negative electrode active material particles and the ferroelectric particles are mixed with each other in the presence of the binder component, the binder is likely to be interposed between the negative electrode active material particles and the ferroelectric particles, which reduces the catalytic action of the ferroelectric particles. Therefore, in order to sufficiently exhibit the catalytic action of the ferroelectric particles, it is necessary that the negative electrode active material particles and the ferroelectric particles are mixed with each other without the binder component being interposed therebetween as described in the embodiment.

The embodiment and Examples disclosed herein are merely exemplary in all respects and are not particularly limited. The scope of the invention is defined not by the above description but by claims, and equivalent meanings to claims and modifications within claims are intended to be embraced therein.

What is claimed is:

1. A method of manufacturing a negative electrode for a nonaqueous electrolyte secondary battery, the method comprising:
    mixing negative electrode active material particles and ferroelectric particles with each other to form first composite particles in which the ferroelectric particles are attached to the negative electrode active material particles;
    mixing the first composite particles and a first binder with each other to form second composite particles;
    mixing the second composite particles with a second binder to form granulated particles having a solid content concentration of 70 mass % or higher and lower than 90 mass %;
    applying pressure to an aggregate of the granulated particles to form a sheet-shaped negative electrode mixture layer; and
    arranging the negative electrode mixture layer on a main surface of a negative electrode current collector foil.

2. The method of manufacturing a negative electrode for a nonaqueous electrolyte secondary battery according to claim 1, wherein
    a mixing amount of the ferroelectric particles is 5 mass % to 40 mass % with respect to a total mass of the negative electrode mixture layer.

3. The method of manufacturing a negative electrode for a nonaqueous electrolyte secondary battery according to claim 1, wherein
    the ferroelectric particles are barium titanate particles.

4. The method of manufacturing a negative electrode for a nonaqueous electrolyte secondary battery according to claim 1, wherein
    negative electrode active material particles and ferroelectric particles are mixed with each other through a dry process to form the first composite particles in which the ferroelectric particles are attached to the negative electrode active material particles.

5. The method of manufacturing a negative electrode for a nonaqueous electrolyte secondary battery according to claim 1, wherein
the second composite particles have a solid content concentration of 90 mass % to 95 mass %.

6. The method of manufacturing a negative electrode for a nonaqueous electrolyte secondary battery according to claim 1, wherein
the first binder is a powder which has a D50 particle size of 200 μm or less.

7. The method of manufacturing a negative electrode for a nonaqueous electrolyte secondary battery according to claim 1, wherein
a mixing amount of the first binder is 0.5 mass % to 2 mass % with respect to the total mass of the negative electrode mixture layer.

8. A method of manufacturing a negative electrode for a nonaqueous electrolyte secondary battery, the method comprising:

mixing negative electrode active material particles and ferroelectric particles with each other to form first composite particles in which the ferroelectric particles are attached to the negative electrode active material particles;

mixing the first composite particles and a first binder with each other to form second composite particles;

mixing the second composite particles with a second binder to form granulated particles having a solid content concentration of 70 mass % or higher and lower than 90 mass %;

applying pressure to an aggregate of the granulated particles to form a sheet-shaped negative electrode mixture layer; and arranging the negative electrode mixture layer on a main surface of a negative electrode current collector foil, wherein the method does not include the formation of a slurry.

\* \* \* \* \*